(12) United States Patent
Belden, Jr. et al.

(10) Patent No.: US 7,522,047 B2
(45) Date of Patent: Apr. 21, 2009

(54) ADJUSTABLE DISPLAY ASSEMBLY FOR A RETAIL PRODUCT

(75) Inventors: Dennis D. Belden, Jr., Canton, OH (US); Ronald M. Marsilio, Lake Wiley, SC (US)

(73) Assignee: InVue Security Products Inc., Charlotte, NC (US)

( * ) Notice: Subject to any disclaimer, the term of this patent is extended or adjusted under 35 U.S.C. 154(b) by 269 days.

(21) Appl. No.: 11/642,011

(22) Filed: Dec. 19, 2006

(65) Prior Publication Data

US 2008/0142665 A1 Jun. 19, 2008

(51) Int. Cl.
*G08B 13/14* (2006.01)

(52) U.S. Cl. .............. 340/568.1; 340/568.2; 340/568.6; 340/541; 340/542; 340/649; 340/664; 248/133; 248/278.1; 248/415; 248/417; 70/57.1

(58) Field of Classification Search .............. 340/568.1, 340/568.2, 568.6, 541, 542, 649, 664; 248/133, 248/278.1, 415, 417; 70/57.1
See application file for complete search history.

(56) References Cited

U.S. PATENT DOCUMENTS

| | | | |
|---|---|---|---|
| 170,314 A | 11/1875 | Toedt | |
| 727,653 A | 5/1903 | Long | |
| 868,973 A | 10/1907 | Datscheg | |
| 1,028,874 A | 6/1912 | Gronek | |
| 2,217,943 A | 10/1940 | Carlson | |
| 2,329,697 A | 2/1943 | Davies | |
| 2,691,407 A | 10/1954 | Kupski | |
| 3,199,826 A | 8/1965 | Miller et al. | |
| 3,719,770 A | 3/1973 | Richardson, Jr. | |
| 3,733,650 A | 5/1973 | Douglas | |
| 4,215,449 A | 8/1980 | Loikitz | |
| 4,631,777 A | 12/1986 | Takimoto | |
| 4,645,153 A | 2/1987 | Granzow et al. | |
| 4,919,383 A | 4/1990 | Benjamin et al. | |
| 4,986,503 A | 1/1991 | Kabat | |
| 5,109,411 A | 4/1992 | O'Connell | |
| 5,146,205 A * | 9/1992 | Keifer et al. | 340/568.2 |
| 5,167,364 A | 12/1992 | Wenning | |
| 5,255,795 A | 10/1993 | Kitmitto | |
| 5,265,311 A | 11/1993 | Gard | |
| 5,341,124 A * | 8/1994 | Leyden et al. | 340/568.4 |
| 5,506,459 A | 4/1996 | Ritts | |
| 6,305,864 B1 | 10/2001 | Nguyen | |
| 6,427,856 B1 | 8/2002 | Allen | |
| 6,476,717 B1 | 11/2002 | Gross et al. | |

(Continued)

*Primary Examiner*—Tai T Nguyen
(74) *Attorney, Agent, or Firm*—Adams Intellectual Property Law, P.A.

(57) ABSTRACT

A display assembly for a retail product has a base and a platform adjustably mounted on an upper end of the base. The platform includes a lower housing which is pivotally supported in a cradle attached to the upper end of the base. The platform is pivotally mounted on the cradle by a pair of pivot pins, at least one of which is threaded to secure the platform in an adjusted tilted position on the cradle. A plurality of notches are formed on the platform housing and selectively engage a detent formed on the cradle to retain the platform in an adjusted position. A sensor may be removably mounted on the platform and connected to the product and to the base by an expandable cord to actuate an alarm if the product is removed in an unauthorized manner from the sensor or base.

15 Claims, 5 Drawing Sheets

U.S. PATENT DOCUMENTS

| | | |
|---|---|---|
| 6,739,567 B1 | 5/2004 | Curtis |
| 6,896,543 B2 | 5/2005 | Fort et al. |
| 6,946,961 B2 * | 9/2005 | Frederiksen et al. ..... 340/568.2 |
| 7,000,289 B2 | 2/2006 | Cedrone |
| 7,053,774 B2 | 5/2006 | Sedon et al. |
| 7,124,993 B2 | 10/2006 | Padiak et al. |
| 7,163,181 B2 | 1/2007 | Omps |
| 7,209,038 B1 | 4/2007 | Deconinck et al. |
| 7,226,028 B2 | 6/2007 | Lin |

* cited by examiner

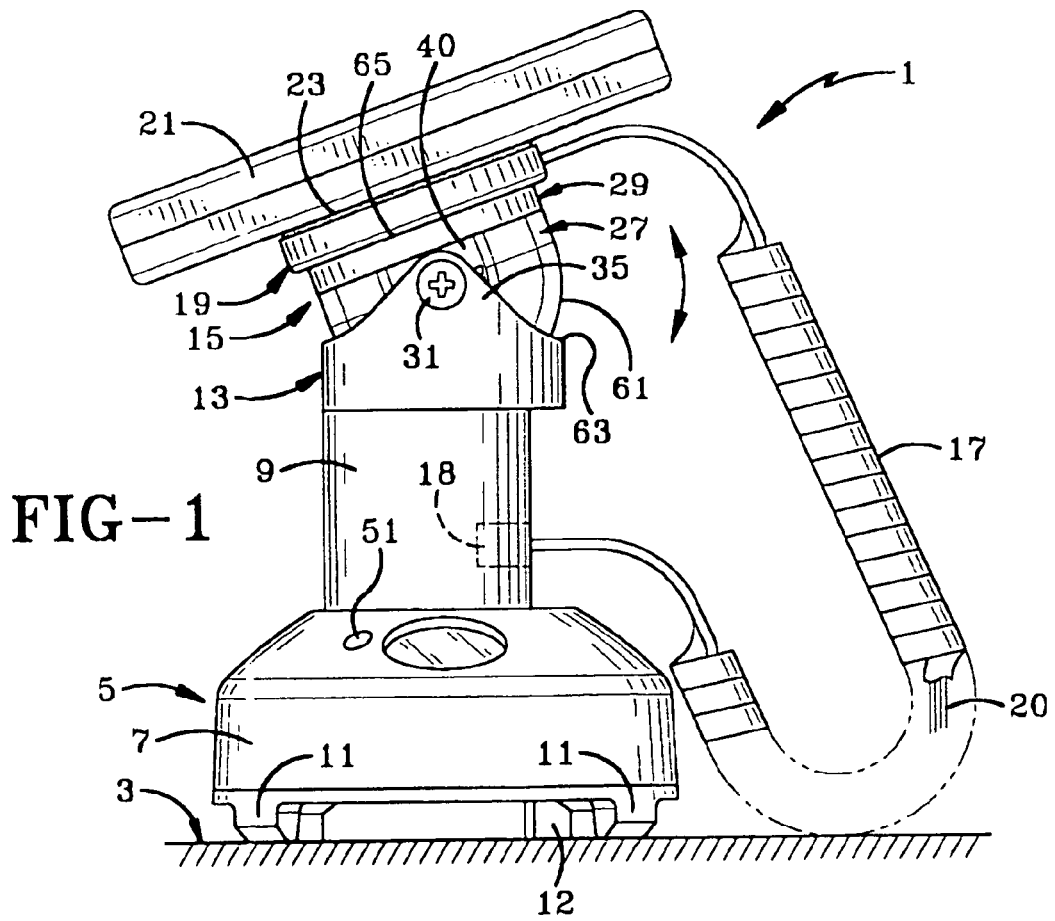
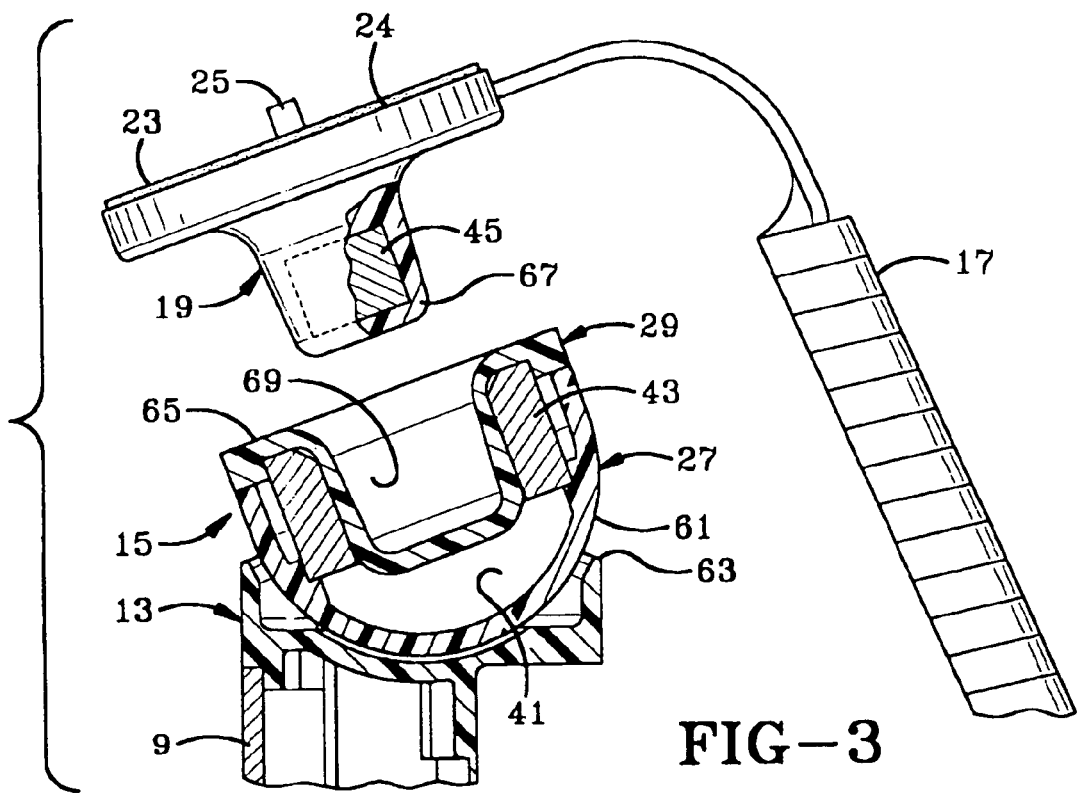

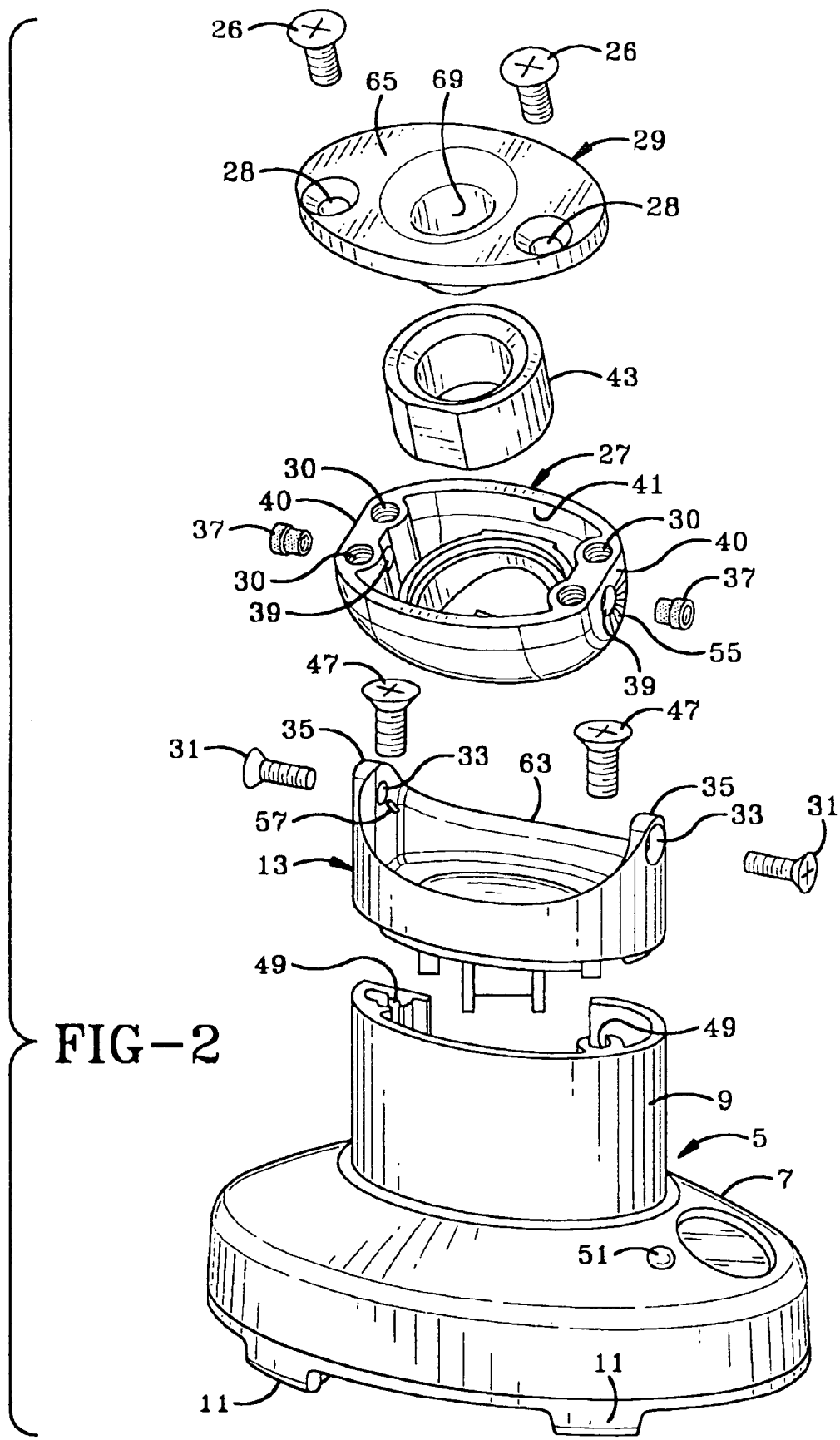

ADJUSTABLE DISPLAY ASSEMBLY FOR A RETAIL PRODUCT

BACKGROUND OF THE INVENTION

1. Technical Field

The invention relates to display stands for merchandise and various retail products, and particularly to a display stand which has a supporting platform which is adjustable to various angles in order to display the product mounted on the platform in the most favorable angular position for viewing by a perspective customer. The invention also enables the retail product to be handled by a perspective customer in a convenient and secure manner.

2. Background Information

A great variety of display structures and stands for displaying retail products have been developed. Most of these display stands provide some means for securing the product to the display stand to prevent unauthorized removal and theft of the displayed product, yet which will enable a perspective customer to easily view the product, and for many products to be able to handle and inspect the product before purchase and without requiring a clerk to be in attendance.

Also for certain products, it is desirable to display the product at a particular angular orientation with respect to the support structure enabling the viewing customer to see the product in the best position to enhance the attractiveness of the product. Varying the viewing angle for different products has been found more desirable than mounting the product in a horizontal or vertical position as in previous product display stands.

In addition, there is a need to provide security against theft of the displayed product and a need to display the product in an orderly manner, in addition to a chosen angular position thereof. This becomes a problem when a potential customer picks up an item of merchandise from the stand, such as a cell phone, camera, etc. in order to review the product and then replace the product back on the support structure. This can result in the display item being relocated on the support structure in an unattractive viewing manner for subsequent customers.

Therefore, the need exists for an improved product display assembly which will enable the product to be displayed at various angular positions by adjustably mounting the product support platform on which the product is secured, which assembly preferably includes means to secure the display platform at the desired angle, which assembly is provided with a security device to prevent unauthorized removal of the product from the display stand yet permit the handling and inspection of the product by the customer, and which will properly orient the product to a desired orientation upon return of the product to the supporting platform of the display stand by the customer.

BRIEF SUMMARY OF THE INVENTION

The present invention provides a display assembly for adjustably displaying a retail product on a base or pedestal which is adapted to be mounted on a support by providing a pivotal display platform mounted on an upper portion of the base or pedestal of the display assembly.

In further accordance with the invention, the display assembly includes an expandable cord attachable to the product by a sensor enabling the product to be removed from the platform and inspected by a perspective customer and which provides an audible alarm should the product be removed from the sensor or the integrity of the connecting cord compromised.

Another feature of the present invention is to provide the support platform and sensor which is attached to the product, with mutually engageable orienting means which will automatically align the product into the correct orientation position on the platform after being returned to the platform by the customer, even when initially placed in an unoriented position on the platform.

A further advantage of the present invention is to form the orienting means by using a pair of magnets, one of which is mounted in the sensor and the other in the pedestal of the base, which due to their polarity will automatically align themselves and accordingly the sensor, and in which the magnets are positioned to ensure the correct orientation of the product after it has been returned to its display assembly.

A further aspect of the present invention is to provide the base with a cradle for pivotally mounting the support platform thereon, and providing a portion of the support platform with printed indicia indicating the angle of the platform with respect to the horizontal enabling a plurality of similar display platforms to be accurately adjusted each to a desired angle.

Still another aspect of the present invention is to provide one of the cradle and platform housing with a series of notches with the other of the cradle and platform housing with detents which are selectively engaged in the notches to place the platform in the desired angular position with respect to the horizontal, and in which the pivot pins which pivotally mount the platform housing on the cradle can be adjusted to increase the gripping force between the detent and selected notch to securely fix the platform in the adjusted angular position.

These features and advantages are obtained by the adjustable display assembly of the present invention, the general nature of which may be stated as including a base adapted to be mounted on a support; a platform for supporting a retail product thereon; a pivot pivotally mounting the platform on the base; and a securement mechanism securing the platform in an adjusted position for displaying a product supported on the platform at a desired angle.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 1 is a side elevational view of the adjustable display assembly of the present invention.

FIG. 2 is an exploded perspective view of the display assembly of FIG. 1.

FIG. 3 is a fragmentary view with portions broken away in section of the upper portion of the pedestal and cradle with the sensor containing the alignment magnets shown separated therefrom.

Similar numbers refer to similar parts throughout the drawings.

DETAILED DESCRIPTION OF THE INVENTION

Figure 4:
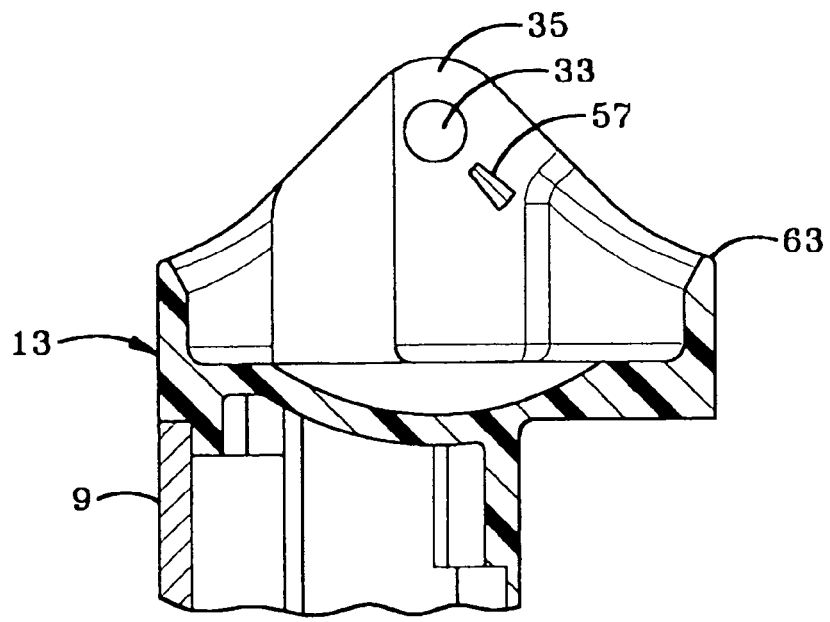
FIG. 4 is a side elevational view with portions in section of the support cradle at the upper end of the pedestal.
Figure 5:
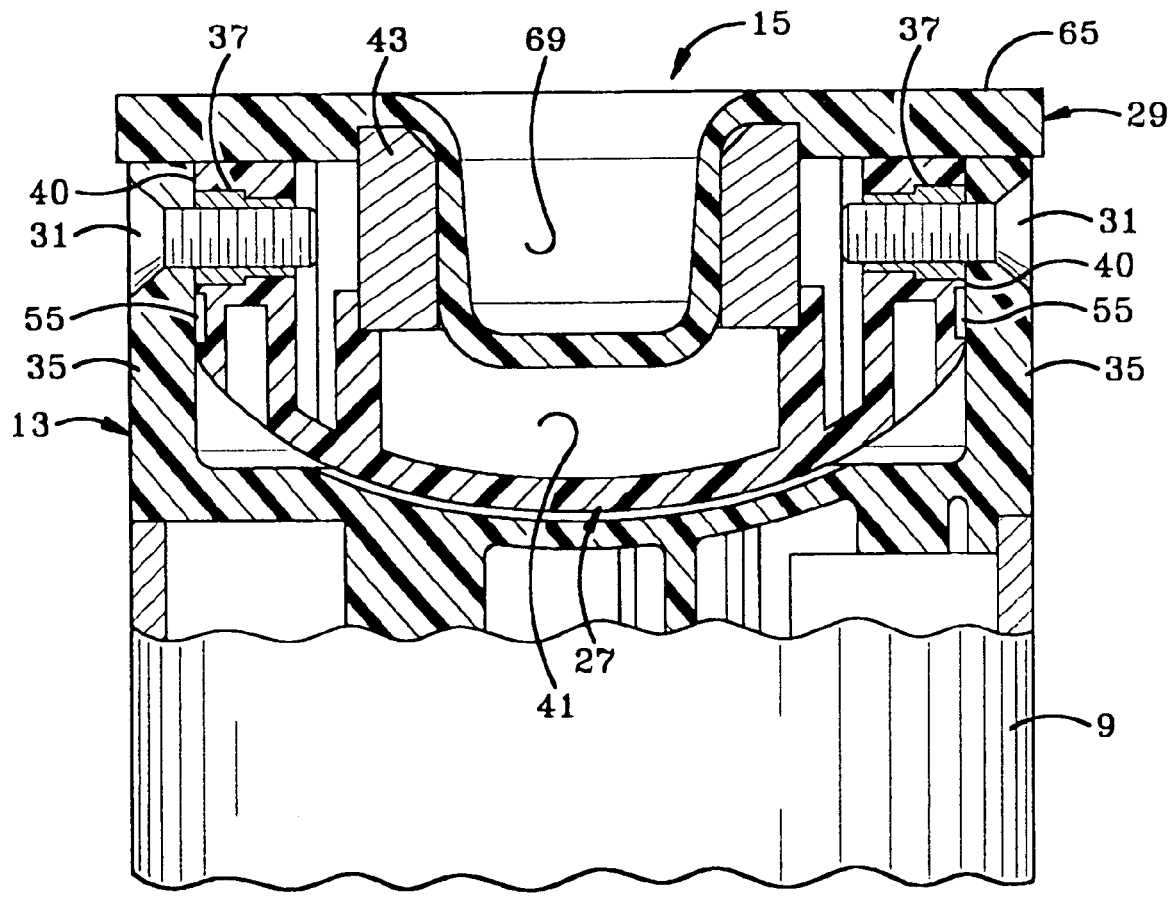
FIG. 5 is a front view with portions broken away and in section showing the pivotal mounting of the platform in the pedestal cradle.
Figure 6:
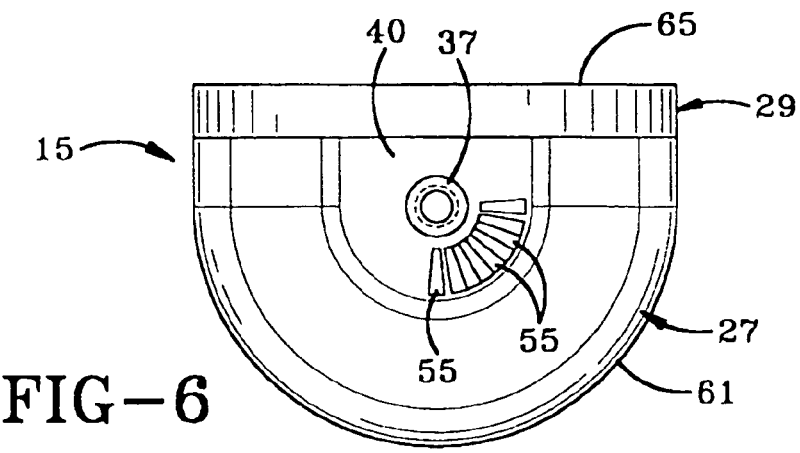
FIG. 6 is a side elevational view of the platform showing the angular positioning notches therein.

The adjustable display assembly of the present invention is indicated generally at 1, and is shown in FIG. 1 mounted on a support surface 3. Display assembly 1 includes a base indicated generally at 5, which includes a foundation 7 and a pedestal 9 extending upwardly vertically therefrom. Base 5 preferably is secured to support surface 3 by a plurality of fasteners (not shown) which can extend into threaded openings formed in a plurality of feet 11 extending from the bottom of foundation 7. This secures the display assembly to a support surface, as well as preventing its unauthorized removal therefrom. If desired, a plunger 12 of a switch mounted within base 5 can contact support surface 3 to sound an alarm if base 5 is removed therefrom.

Assembly 1 further includes a cradle indicated generally at 13, mounted on the upper end of pedestal 9 on which is pivotally mounted a platform indicated generally at 15. An expandable cord 17 preferably is connected to pedestal 9 by a phone-type plug or jack 18, and at another end to a sensor 19 which is removably mounted on platform 15. Cord 17 preferably contains a plurality of electrical conductors 20 for electrically connecting sensor 19 to base 5. If desired sensor 19 can be only mechanically connected to base 5 by a cable instead of electrical cord 17 without affecting the concept of the invention. Sensor 19 is shown attached to a retail product 21 preferably by a pressure sensitive adhesive strip 23 mounted on a flat planar surface 24 of sensor 19. Sensor 19 preferably includes a plunger actuated switch 25 which is moved to a depressed state when attached to product 21, and which will project outwardly from the sensor as shown in FIG. 3 when the product is removed from the sensor to sound an alarm. The alarm can be contained in base 5 or at a remote location, depending upon the particular type of alarm system that could be used with display assembly 1.

Platform 15 includes a bowl-shaped lower housing 27 (FIG. 2) and a top product supporting member 29. Member 29 is secured to housing 27 by a pair of screws 26 which extend through holes 28 and into threaded holes 30 formed in housing 27. In accordance with one of the features of the invention, platform housing 27 is pivotally mounted within cradle 13 preferably by a pair of pivot pins or threaded bolts 31 which extend through non-threaded holes 33 formed in a pair of upstanding spaced supports 35 of cradle 13 and into a pair of threaded inserts 37 which are fixed in aligned holes 39 formed in flat planar side surfaces 40 of housing 27. Platform housing 27 preferably has a hollow interior 41 in which is mounted a ring magnet 43 which cooperates with another magnet 45 mounted within sensor 19 as shown in FIG. 3. This provides for the self-orienting ability of sensor 19 and the product 21 on platform 15 as described in detail in pending patent application Ser. No. 11/431,291, filed May 10, 2006, the contents of which are incorporated herein by references.

As shown in FIG. 2, cradle 13 may be a separate component mounted on the upper end of pedestal 9 by a pair of fasteners 47 which extend into threaded apertures 49 formed in the upper end of pedestal 9. This provides easy access to the interior of pedestal 9 for the placement of cord-receiving plug 18 or other components of an alarm or monitoring system, and for the mounting of a LED 51 in foundation 7 of base 5.

Figure 8:
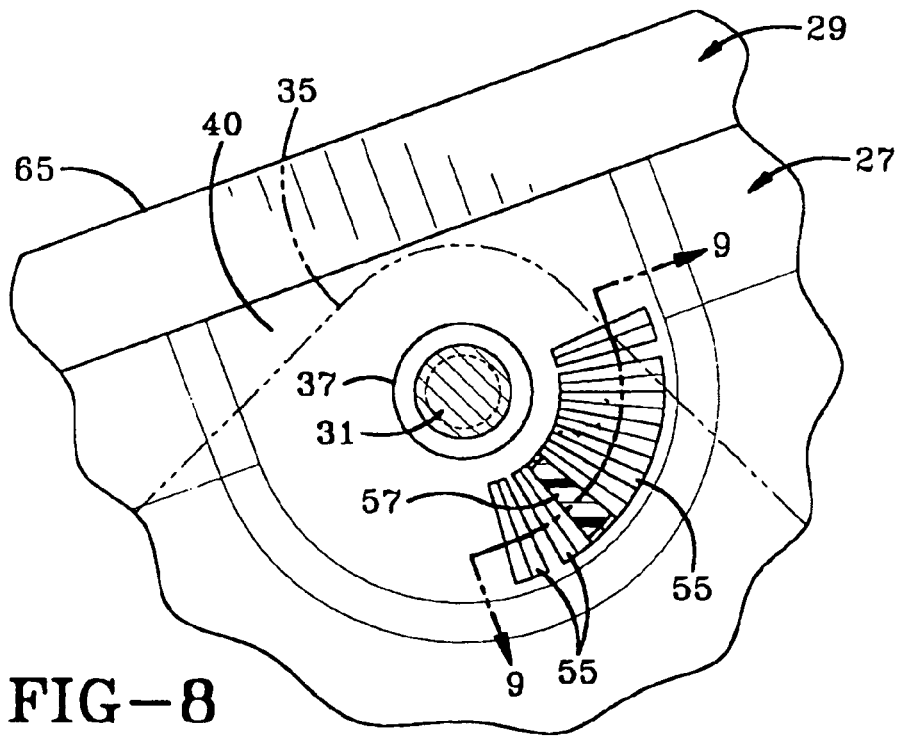
FIG. 8 is a fragmentary view showing the engagement of a positioning detent of the cradle within one of the notches of the platform housing.
Figure 9:
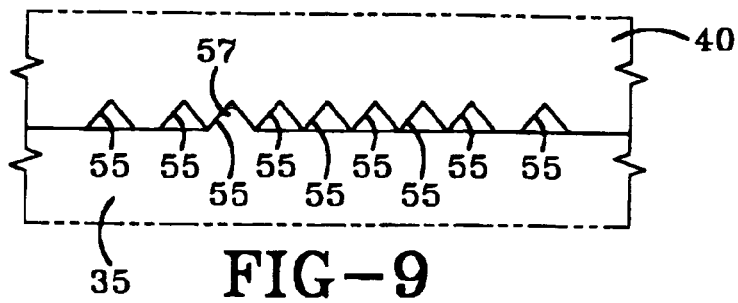
FIG. 9 is an enlarged fragmentary sectional view taken on lines 9-9, FIG. 8.

In accordance with another of the main features of the invention, a series of spaced notches 55 are formed in at least one and preferably both of the platform housing side surfaces 40. Notches 55 selectively engage a corresponding detent 57, one of which is formed on an inside surface of each support of cradle 35 as shown in FIGS. 8 and 9. If desired, notches 55 can be a separate member attached to side surface 40 or formed from an overmold of powdered metal. Likewise, detent 57 can be a separate component attached to the interior surface of cradle 13 or formed integrally therewith without departing from the concept of the invention.

Figure 7:
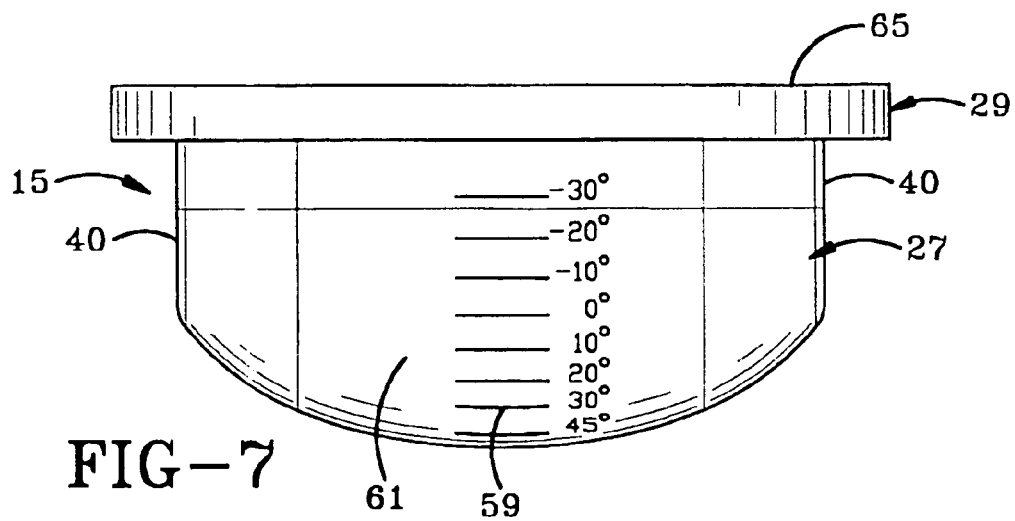
FIG. 7 is a front elevational view of the platform having the angular position indicia shown thereon.
Figure 10:
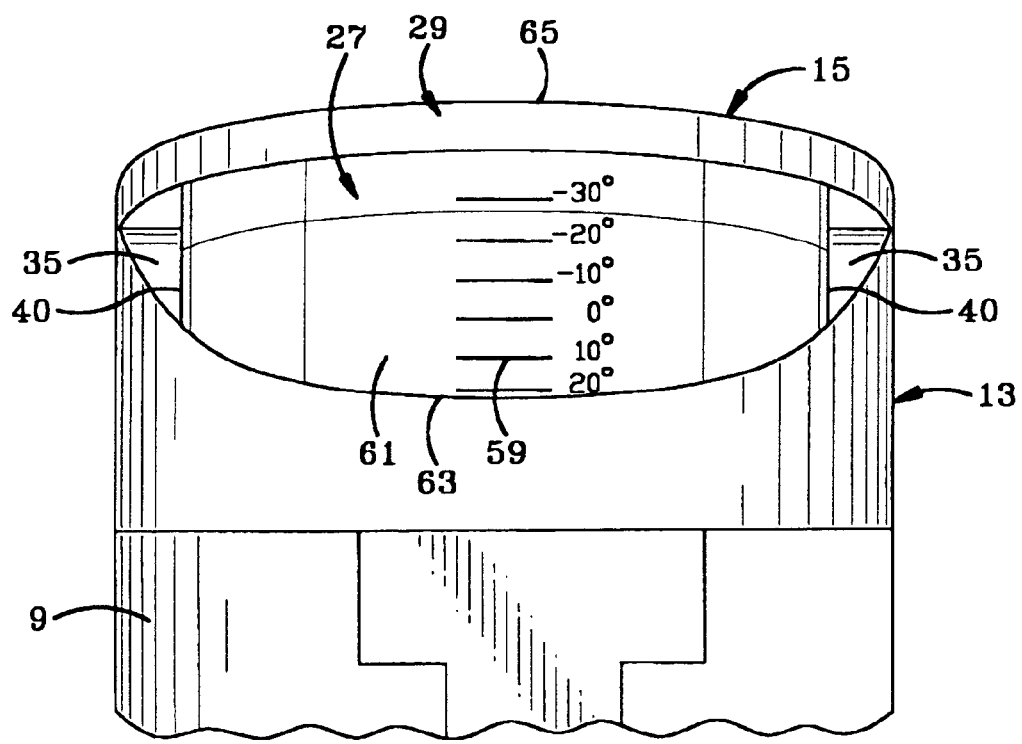
FIG. 10 is a rear view of the cradle and platform mounted thereon at an angle of 20° with respect to the horizontal.

In further accordance with another feature of the invention, a plurality of angular indicia 59 (FIG. 7) are placed on a generally curved back surface 61 of platform housing 27 and are adapted to align with a slightly curved concave back edge 63 of cradle 13 as shown in FIG. 10, which indicates the angular position of the top surface 65 of platform member 29 with respect to the horizontal. This enables the platform to be adjusted to the desired angle best determined for the display of the retail product 21 mounted thereon. Notches 55 may have a saw tooth-like pattern as shown in FIG. 9, with detents 57 also being complementary in shape and size to notches 55 to seat firmly therein as shown in FIG. 9. If desired, one or more of the pivot pins 31 can be rotated to tighten the pressure between the inside surfaces of cradle supports 35 and planar side surfaces 40 of platform housing 27 to firmly secure platform 15 in the desired angular position. However, depending upon the weight of product 21 and the desired angular position, the engagement of detents 57 in notches 55 may be sufficient to secure the platform in the desired position without tightening pivot pins 31 therein.

Thus, the merchant will place a product 21 on display assembly 1 and easily adjust bowl-shaped housing 27 into the desired angular position, accurately by matching the desired angular printed indicia line 59 with edge 63 of cradle 13, afterwhich pivot pins 31 may be tightened to firmly secure the platform in the desired angular position. Product 21 then could be attached directly to the top of platform 15 or attached to removable sensor 19 as shown in the drawings and described above. However, for certain products, it may be desirable to securely fix the product to platform 15 permanently for display at the desired angular position without enabling the customer to remove the product therefrom for subsequent handling by the use of sensor 19 and cord 17. However, for display of many consumer products, it is desirable that the customer can remove the product from display assembly 1 and handle the same, such as a camera, cell phone, etc. Display assembly 1 enables this feature to be achieved, as well as displaying the product when mounted on the display assembly at the desired angular position, which angular position is easily adjustable depending upon the most desirable angle of the product for display purposes.

Also, sensor 19 may contain magnet 45 which is magnetically attracted to ring magnet 43 mounted in platform housing 27, which automatically orients platform 15 to the desired position due to the polarities of magnets 43 and 45, as discussed in detail in the above-referenced pending patent application Ser. No. 11/431,291. Magnet 45 preferably is located within a post 67 formed on sensor 19 when adapted to be seated within a recess 69 formed in platform member 29 around which ring magnet 43 is located. Thus, when placing post 67 in recess 69, the attraction and repulsion of the magnets polarities will orient platform 15 with respect to pedestal 9.

However, in accordance with the main feature of the invention, display assembly 1 provides easy adjustment of platform 15 for the displaying of a retail product 21 thereon by the pivotal mounting of platform housing 27 within cradle 13 in combination with the use of positioning detents 57, spaced notches 55, and pivot pins 31. It is readily seen that other types of devices could be used for pivotally mounting the platform on the upper end of pedestal 9, as well as for securing the platform in the adjusted position than that shown in the drawings and described above without departing from the concept of the invention.

Figure 11:
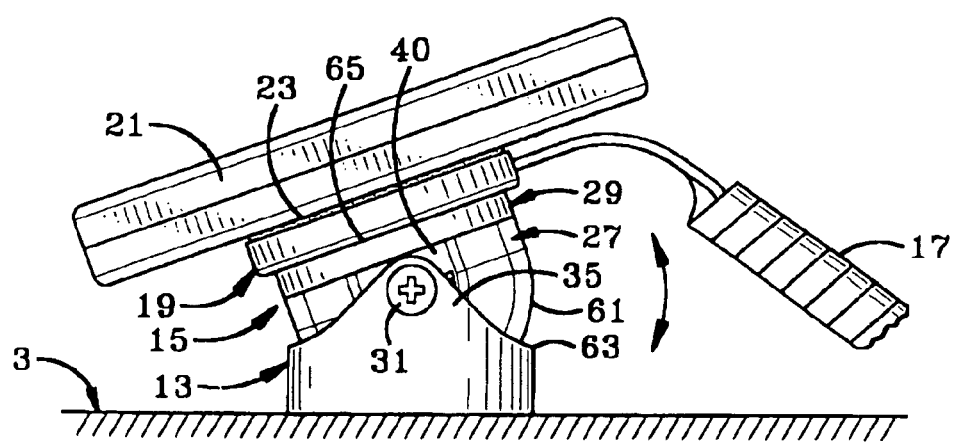
FIG. 11 is a modified embodiment showing a different mounting arrangement for the adjustable display assembly.

As shown in FIG. 11, cradle 13 can be attached directly to support surface 3 without an intervening base and pedestal. In this mounting arrangement, cradle 13 functions both as the mounting base and means for pivotally mounting platform 15. Also, display assembly 1 as shown in both FIGS. 1 and 11 can be mounted on various support surfaces 3 regardless of its orientation. Surface 3 can be horizontal as shown, or vertical, angular etc. without affecting the results achieved by the invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An adjustable display assembly for a retail product, said assembly comprising:
   a base adapted to be mounted on a support
   a cradle coupled to an upper end of the base;
   a platform pivotally mounted on the cradle;
   a sensor removably mounted on the platform; and
   a plurality of notches on one of the platform and the cradle and at least one detent on the other of the platform and the cradle securing the platform on the cradle in an adjusted position for displaying the product at a desired angle.

2. The display assembly defined in claim 1 in which the cradle has a pair of spaced supports; and in which the platform includes a platform housing moveable within the cradle by a pair of pivot pins which pivotally connect the platform housing to the spaced supports.

3. The display assembly defined in claim 2 wherein the platform further includes a top product supporting member having a platform support surface on which the sensor is supported.

4. The display assembly defined in claim 3 wherein the cradle has an edge; and in which the platform housing has a plurality of spaced indicia marks, which when selectively aligned with the cradle edge indicate the angular position of the platform support surface.

5. The display assembly defined in claim 4 wherein the cradle edge is concavely curved; and in which the spaced indicia on the platform housing are spaced lines, each of which represents an angle of the top support surface of the housing with respect to horizontal.

6. The display assembly defined in claim 3 wherein at least one of the pivot pins is adjustable to apply tension between the cradle and platform housing to secure the platform support surface at the selected angle.

7. The display assembly as defined in claim 2 wherein the pivot pins includes at least one threaded member for tightening pivoting tension between the cradle and platform housing.

8. The display assembly defined in claim 1 in which the sensor is adapted to be attached to the product; and in which the sensor is connected to an alarm system to prevent unauthorized removal of the product from the sensor.

9. The display assembly defined in claim 8 wherein the platform includes a self-aligning mechanism for moving the sensor from an unaligned orientation with respect to the base to a chosen display orientation.

10. The display assembly defined in claim 9 wherein the self-aligning mechanism includes a first magnet mounted in the sensor and a second magnet mounted in the platform for moving the sensor automatically to the chosen display orientation.

11. The display assembly defined in claim 10 in which the first magnet is mounted in a post extending from the sensor; and in which the second magnet is a ring magnet mounted in the platform housing surrounding a recess formed therein in which a post is seated.

12. The display assembly defined in claim 8 wherein a cord extends between the sensor and base for mechanically connecting the sensor to the base.

13. The display assembly defined in claim 12 wherein the cord contains a plurality of conductors electrically connecting the sensor to the base; and in which the sensor contains a switch for actuating an alarm upon unauthorized removal of the product from the sensor.

14. The display assembly defined in claim 13 wherein the cord is a coiled expandable cord; and in which the cord is connected to the base by a plug.

15. The display assembly defined in claim 1 wherein the base includes a foundation and a pedestal extending generally vertically from the foundation; and in which the platform is adjustable mounted on an upper end of the pedestal.

* * * * *